UNITED STATES PATENT OFFICE.

ALFONS LANGER, OF FRIEDRICHSBERG, NEAR BERLIN, GERMANY, ASSIGNOR TO KARL AUGUST LINGNER, OF DRESDEN, GERMANY.

PROCESS OF MANUFACTURING BLOOD-ALBUMIN PREPARATIONS.

No. 884,025.  Specification of Letters Patent.  Patented April 7, 1908.

Application filed April 17, 1905. Serial No. 256,161.

*To all whom it may concern:*

Be it known that I, ALFONS LANGER, a citizen of the German Empire, residing at Friedrichsberg, near Berlin, Germany, have invented a new and useful Process for the Manufacture of Blood-Albumin Preparations, of which the following is a full, clear, and exact description.

The present invention consists of a process for producing non-hygroscopic blood albumin preparations, which are insoluble in water and which products form the subject matter of an application bearing the same date and Serial No. 349335.

It is known that by mixing defibrinized animal blood with inorganic insoluble or practically insoluble salts of calcium, such for instance as carbonate of calcium, oxid of calcium, calcium hydrate, dicalcium phosphate, products with hæmoglobin iron are obtained, the hæmoglobin iron contents of which are increased to the extent of $33\frac{1}{3}\%$ by extraction with water. It has now been found, in contradistinction to this treatment, that organic, easily soluble salts of calcium may be employed, such for instance as calcium glycerophosphate, in order to enrich the product with hæmoglobin iron. These soluble organic salts may be allowed to act on the defibrinized animal blood in the presence of inorganic calcium salts such as calcium hydrate.

In carrying out the process for instance 250 kg. of defibrinized ox-blood are taken and about 4 kg. of calcium glycerophosphate are dissolved therein and then about 12 kg. of calcium hydrate are added, containing from 40%–50% $Ca(OH)_2$. The whole mass sets in a few hours to a gelatinous mass, which is dried at a temperature below 100° C. The dried product is reduced to a powder and washed with water and dried. The product is a dark powder, insoluble in spirits, but soluble in alkaline intestinal juice and acid gastric juice. It is intended for pharmaceutical use or for purposes of nourishment or luxury.

I claim as my invention:—

A process for producing blood albumin preparations which consists in mixing defibrinized animal blood with organic calcium salts soluble in water, in the presence of inorganic calcium salts, permitting the whole to stand until it becomes a gelatinous mass, drying at a low temperature and reducing to a powder.

In testimony whereof I affix my signature in the presence of two witnesses.

ALFONS LANGER.

Witnesses:
 HENRY HASPER,
 WOLDEMAR HAUPT.